(12) United States Patent
Lawrance et al.

(10) Patent No.: US 8,499,286 B2
(45) Date of Patent: Jul. 30, 2013

(54) MODULE TESTING ADJUSTMENT AND CONFIGURATION

(75) Inventors: Steven S. Lawrance, San Francisco, CA (US); Marcus Ericsson, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 390 days.

(21) Appl. No.: 12/844,602

(22) Filed: Jul. 27, 2010

(65) Prior Publication Data

US 2012/0030514 A1 Feb. 2, 2012

(51) Int. Cl.
G06F 9/44 (2006.01)
G06F 11/00 (2006.01)

(52) U.S. Cl.
USPC .......... 717/124; 714/38.1; 714/741; 714/708; 714/701; 714/32; 717/143; 717/141; 717/134; 717/135; 379/10.01

(58) Field of Classification Search
USPC .......... 714/38, 701, 741, 708, 32; 379/10.01; 717/124, 143, 141, 134, 135
See application file for complete search history.

(56) References Cited

U.S. PATENT DOCUMENTS

| | | | | |
|---|---|---|---|---|
| 5,130,936 A | * | 7/1992 | Sheppard et al. | 702/123 |
| 5,193,178 A | * | 3/1993 | Chillarege et al. | 714/25 |
| 5,371,883 A | * | 12/1994 | Gross et al. | 714/38.1 |
| 5,412,801 A | * | 5/1995 | de Remer et al. | 714/20 |
| 5,557,539 A | * | 9/1996 | Fitch | 709/206 |
| 5,577,188 A | | 11/1996 | Zhu | |
| 5,608,872 A | | 3/1997 | Schwartz et al. | |
| 5,649,104 A | | 7/1997 | Carleton et al. | |
| 5,671,351 A | * | 9/1997 | Wild et al. | 714/38.13 |
| 5,673,387 A | * | 9/1997 | Chen et al. | 714/38.1 |
| 5,715,450 A | | 2/1998 | Ambrose et al. | |
| 5,729,554 A | * | 3/1998 | Weir et al. | 714/739 |
| 5,740,353 A | * | 4/1998 | Kreulen et al. | 714/42 |
| 5,751,941 A | * | 5/1998 | Hinds et al. | 714/38.14 |
| 5,761,419 A | | 6/1998 | Schwartz et al. | |
| 5,819,038 A | | 10/1998 | Carleton et al. | |
| 5,821,937 A | | 10/1998 | Tonelli et al. | |
| 5,831,610 A | | 11/1998 | Tonelli et al. | |
| 5,831,998 A | * | 11/1998 | Ozmizrak | 714/741 |
| 5,873,096 A | | 2/1999 | Lim et al. | |
| 5,892,947 A | * | 4/1999 | DeLong et al. | 717/100 |
| 5,918,159 A | | 6/1999 | Fomukong et al. | |
| 5,960,457 A | * | 9/1999 | Skrovan et al. | 711/146 |
| 5,963,953 A | | 10/1999 | Cram et al. | |
| 6,011,830 A | * | 1/2000 | Sasin et al. | 379/10.03 |
| 6,031,990 A | * | 2/2000 | Sivakumar et al. | 717/124 |
| 6,088,690 A | * | 7/2000 | Gounares et al. | 706/13 |

(Continued)

*Primary Examiner* — Joshua P Lottich
*Assistant Examiner* — Jeison C Arcos
(74) *Attorney, Agent, or Firm* — Ingrassia Fisher & Lorenz, P.C.

(57) ABSTRACT

In one embodiment, a method for testing adjustment and configuration is disclosed. The method can include accessing source code of a test framework that is configured for testing a module, creating a configuration folder having a property override for a test suite for the module testing, determining a source root folder for the test suite, starting the test framework by passing in an identifier for the test suite, and adding a custom test to the source root folder using the configuration folder to customize the test suite. The method can further include compiling the test framework with each of the plurality of test folders enabled. The method also may use a refactoring tool to make changes in a file within the test framework.

15 Claims, 4 Drawing Sheets

U.S. PATENT DOCUMENTS

| | | | |
|---|---|---|---|
| 6,092,083 A | 7/2000 | Brodersen et al. | |
| 6,148,427 A * | 11/2000 | Sherwood et al. | 714/738 |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,219,829 B1 * | 4/2001 | Sivakumar et al. | 717/131 |
| 6,233,617 B1 | 5/2001 | Rothwein et al. | |
| 6,266,669 B1 | 7/2001 | Brodersen et al. | |
| 6,279,124 B1 * | 8/2001 | Brouwer et al. | 714/38.11 |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,633,878 B1 * | 10/2003 | Underwood | 1/1 |
| 6,654,032 B1 | 11/2003 | Zhu et al. | |
| 6,662,312 B1 * | 12/2003 | Keller et al. | 714/38.14 |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,715,108 B1 * | 3/2004 | Badger et al. | 714/38.1 |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,961,937 B2 * | 11/2005 | Avvari et al. | 718/104 |
| 7,340,411 B2 | 3/2008 | Cook | |
| 7,356,436 B2 * | 4/2008 | Bohizic et al. | 702/119 |
| 7,620,655 B2 | 11/2009 | Larsson et al. | |
| 7,698,160 B2 | 4/2010 | Beaven et al. | |
| 7,729,891 B2 * | 6/2010 | Fine et al. | 703/2 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2001/0044791 A1 | 11/2001 | Richter et al. | |
| 2001/0052089 A1 * | 12/2001 | Gustavsson et al. | 714/38 |
| 2002/0072951 A1 | 6/2002 | Lee et al. | |
| 2002/0082892 A1 | 6/2002 | Raffel | |
| 2002/0091968 A1 * | 7/2002 | Moreaux et al. | 714/38 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0018932 A1 * | 1/2003 | Blum et al. | 714/46 |
| 2003/0028856 A1 * | 2/2003 | Apuzzo et al. | 717/124 |
| 2003/0037314 A1 * | 2/2003 | Apuzzo et al. | 717/125 |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0191985 A1 * | 10/2003 | Barrett | 714/32 |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0010781 A1 * | 1/2004 | Maly et al. | 717/143 |
| 2004/0015981 A1 | 1/2004 | Coker et al. | |
| 2004/0025088 A1 * | 2/2004 | Avvari et al. | 714/38 |
| 2004/0027388 A1 | 2/2004 | Berg et al. | |
| 2004/0088677 A1 * | 5/2004 | Williams | 717/104 |
| 2004/0128001 A1 | 7/2004 | Levin et al. | |
| 2004/0181713 A1 * | 9/2004 | Lambert | 714/48 |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0076282 A1 * | 4/2005 | Thompson et al. | 714/739 |
| 2005/0086565 A1 * | 4/2005 | Thompson et al. | 714/741 |
| 2005/0091098 A1 | 4/2005 | Brodersen et al. | |
| 2005/0154939 A1 * | 7/2005 | De Pauw et al. | 714/25 |
| 2005/0229162 A1 * | 10/2005 | Tanner | 717/126 |
| 2007/0088765 A1 * | 4/2007 | Hunt et al. | 707/202 |
| 2007/0162894 A1 * | 7/2007 | Noller et al. | 717/124 |
| 2007/0168734 A1 * | 7/2007 | Vasile | 714/33 |
| 2011/0258599 A1 * | 10/2011 | Li | 717/122 |
| 2011/0283148 A1 * | 11/2011 | Rossi | 714/38.1 |

* cited by examiner

MODULE TESTING ADJUSTMENT AND CONFIGURATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to adjusting a software testing framework in a multi-tenant database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. Unfortunately, it is difficult in many conventional approaches to adjust and customize test frameworks to suit the needs of a particular application.

BRIEF SUMMARY

In accordance with embodiments, there are provided mechanisms and methods for testing modules. Such approaches can enable access of source code of a test framework that is configured for testing a module in the multi-tenant database system. The approach further includes creating a configuration folder having a property override for a test suite for the module testing and determining a source root folder for the test suite. These approaches can enable starting the test framework by passing in an identifier for the test suite and adding a custom test to the source root folder using the configuration folder to customize the test suite.

In an embodiment and by way of example, a method for testing a module is provided. This particular example method includes accessing source code of a test framework that is configured for testing a module in the multi-tenant database system, creating a configuration folder having a property override for a test suite for the module testing, determining a source root folder for the test suite, starting the test framework by passing in an identifier for the test suite, and adding a custom test to the source root folder using the configuration folder to customize the test suite.

While the present invention is described with reference to an embodiment in which techniques for testing in a multi-tenant database environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for testing modules, and adjusting and configuration of test frameworks.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for testing modules will be described with reference to example embodiments.

System Overview

Figure 1:
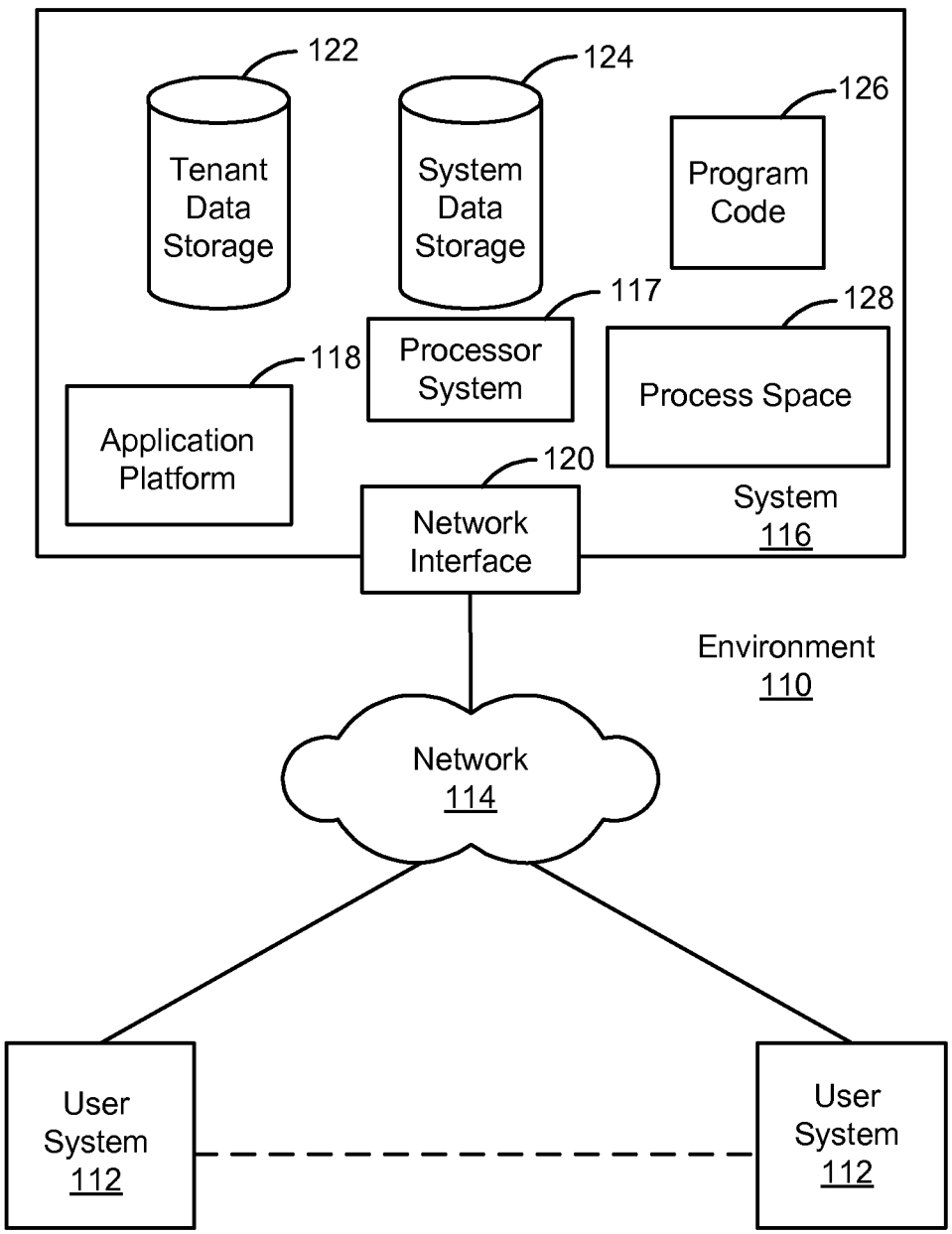
FIG. 1 illustrates a block diagram of an example of an environment where an on-demand database service might be used.

FIG. 1 illustrates a block diagram of an environment 110 where an on-demand database service might be used. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system 116. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116.

An on-demand database service, such as system 116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creating, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system 112 has the capacities allotted to that salesperson. However, while an administrator is using that user system 112 to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 16 may provide tenant access to multiple hosted (standard and custom) applications, including a CRM application. User (or third party developer) applications, which may or may not include CRM, may be supported by application platform 118, which manages creation, storage of the applications into one or more database objects and executing of the applications in a virtual machine in the process space of system 116.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical disks, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
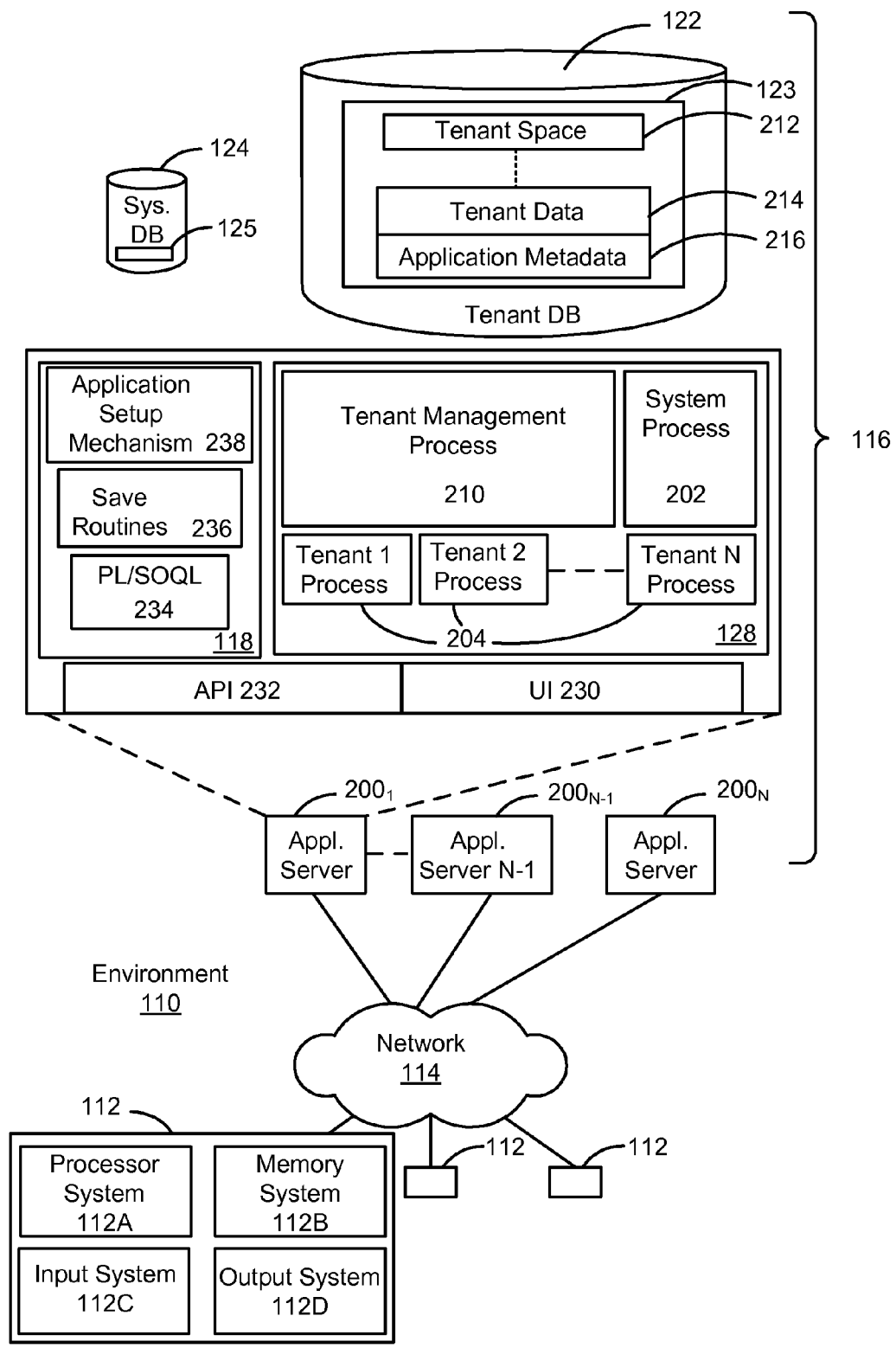
FIG. 2 illustrates a block diagram of an embodiment of elements of FIG. 1 and various possible interconnections between these elements.

FIG. 2 also illustrates environment 110. However, in FIG. 2 elements of system 116 and various interconnections in an embodiment are further illustrated. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown by FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data 123 and the system data 125 may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. Invocations to applications may be detected by one or more system processes, which manages retrieving application metadata 216 for the subscriber making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, where system 116 handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc. all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Example Testing Methods

Figure 3:
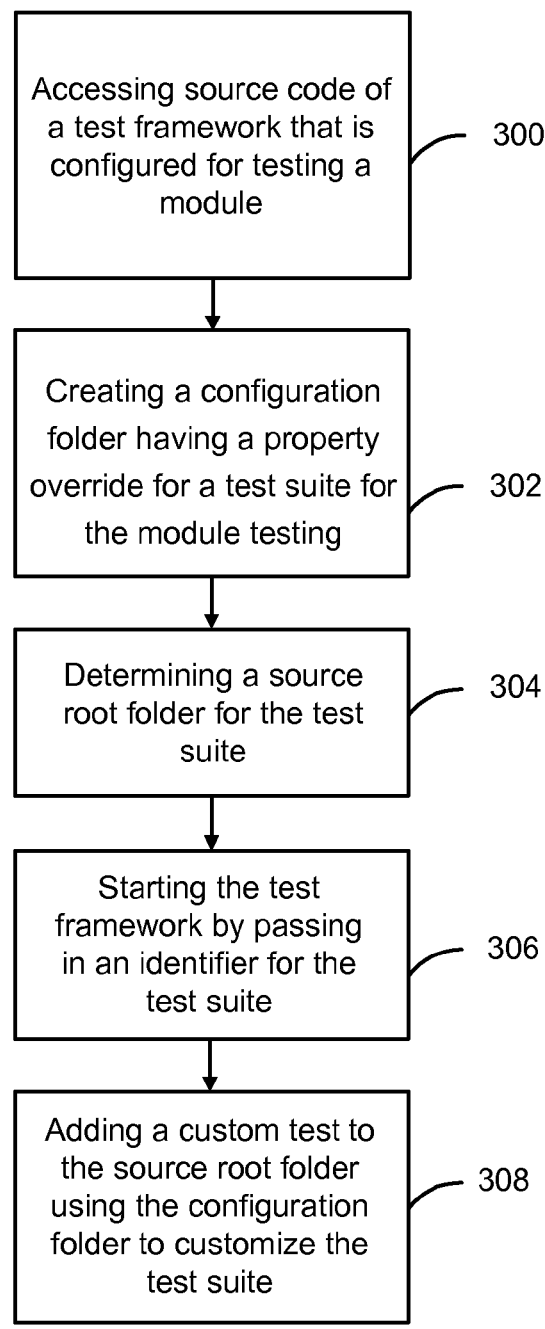
FIG. 3 illustrates an example simplified flow diagram for testing a module.

Referring now to FIG. 3, shown is an example simplified flow diagram of a method for testing a module, such as in a multi-tenant database environment. Source code of a test framework that is configured for testing the module may be accessed as indicated at block 300. A configuration folder having a property override for a test suite for the module testing can be created as indicated at block 302, and a source root folder for the test suite may be determined as shown in block 304. The test framework can be started by passing in an identifier for the test suite, as indicated at block 306, and a custom test to the source root folder may be added to customize the test suite using the configuration folder, as shown in block 308.

Figure 4:
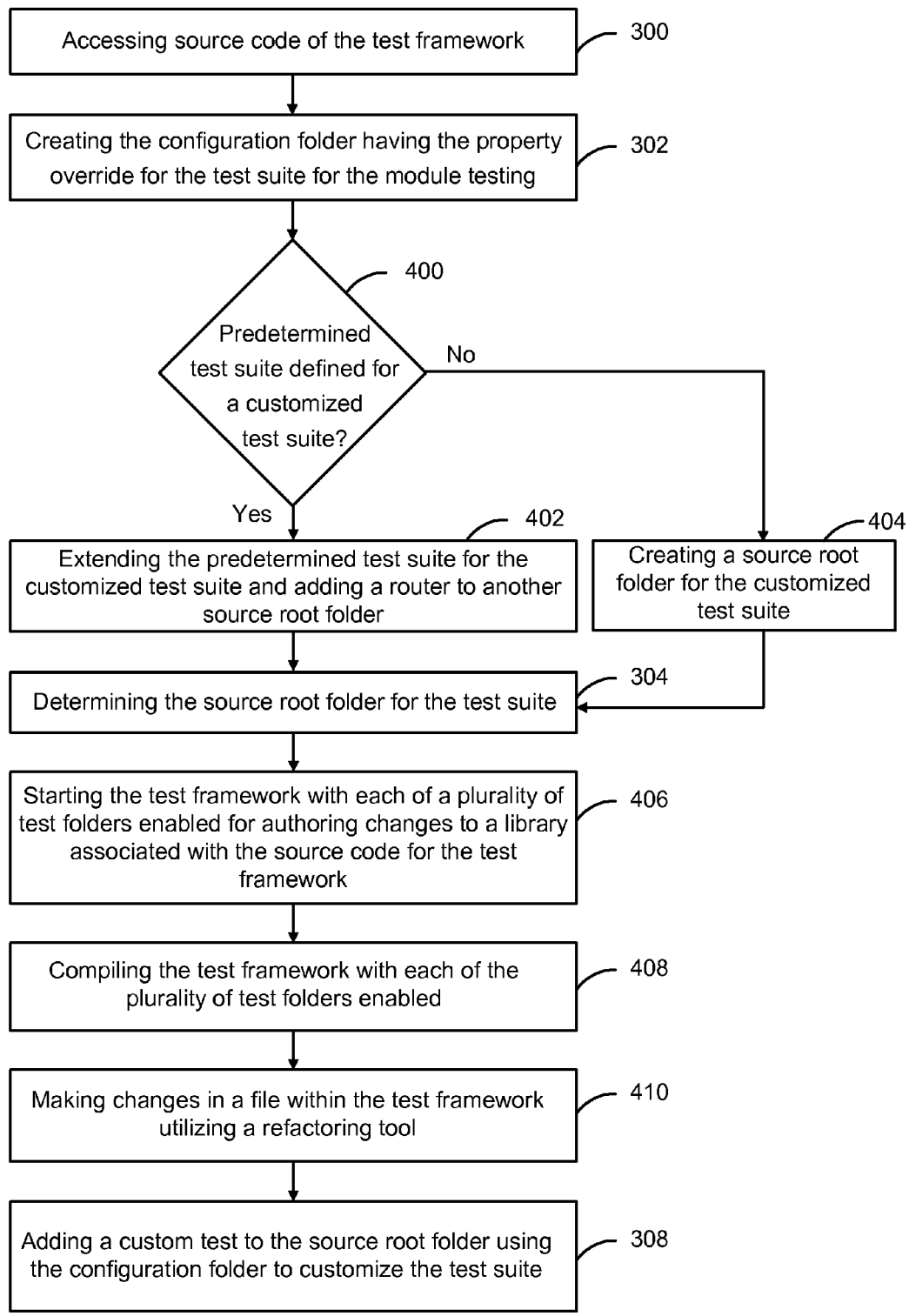
FIG. 4 illustrates a more detailed flow diagram of the simplified flow diagram exemplified in FIG. 3.

Referring now to FIG. 4, shown is a more detailed flow diagram of the example shown in FIG. 3. The source code of the test framework may be accessed, as indicated at block 300, and the configuration folder having the property override for the test suite may be created, as shown in block 302. A check can be made at block 400 to verify whether a predetermined test suite is defined for a customized test suite. If the check made at block 400 is evaluated to "Yes," the predetermined test suite may be extended for the customized test suite, and a router or path can be added to another source root folder, as indicated at block 402. However, if the check made at block 400 is evaluated to "No," a source root folder may be created for the customized test suite, as indicated at block 404. Finally, the source root folder for the test suite may be determined, as shown in block 304. The test framework can be started with each of a plurality of test folders enabled for authoring changes to a library associated with the source code for the test framework, as indicated at block 406. The test framework may be compiled with each of the plurality of test folders enabled, as indicated at block 408. Changes are made in a test framework file, e.g., by utilizing a refactoring tool, as indicated at block 410, and the custom test to the source root folder may be added to customize the test suite using the configuration folder as shown in block 308.

The particular example method for testing a module that is described in FIGS. 3 and 4 can utilize a concept where all software built on top of the test framework is stored with the test framework in the same source code repository. This can accommodate drastic code changes in the test framework to occur using modern refactoring tools, and those refactoring tools are able to properly modify the source code that was built on top of the test framework. This is made possible because that source code is stored in the same place as the test framework. This gives the authors of the test framework a substantially larger degree of freedom in the types of changes that can be made. When a test suite is selected, only the source code that is relevant for that test suite may be compiled and included in the development environment. This shortens the time required to prepare a test suite for execution.

The selected test suite affects the configuration values at runtime, and it is possible for the test suite to set configuration values for that test suite only, which can help compartmentalize test suites that are built on top of the core test framework. This configuration system uses "strong typing," which is a practice of representing configuration property values using data types that are directly relevant for each configuration property. Examples include character strings, numeric integers, URLs, and floating point values. A team that uses a specific test suite can thus develop their tests in isolation from other teams. This includes the inability for another team's changes to other test suites to break the ability to compile and build one's own test suite. Meanwhile, the authors of the test framework may retain the ability to see all test suites' source codes for the purposes of test framework refactoring and development.

Particular embodiments provide for isolation of test suites in a manner that gives individual test suites a high degree of individual freedom, while retaining the ability for the test framework authors to compile the framework with the entire set of suites selected. In this way, a balance between competing attributes of maximizing test suite flexibility while maximizing the freedom of the test framework authors to significantly refactor the test framework, may be achieved. Further, example methods combined the test suites and the test framework into a common codebase, while adding test suite isolation features, thereby yielding a balance that achieves the best of both competing attributes.

Using configuration metadata and a separation of test suites, the test framework's set of strongly typed configuration values and available source code of the test framework described the FIGS. 3 and 4 can differ based upon the presently selected test suite. Example methods adjust the test framework, provide for centralized modifications, and also permit multiple teams to use the same testing framework without having to spend time in compiling tests or seeing configuration keys that belong to other suites. Refactoring the test framework becomes easier with this approach as it is possible to select all suites and make sweeping code changes with one check-in instead of requiring the framework-using teams to make their own changes for the refactoring or worry about providing backward compatibility.

Example Test Framework Adjustment and Configuration

Particular embodiments can be implemented in a "ProdTest" test framework, as exemplified below. The ProdTest's properties system allow for configuration of ProdTest's behavior in multiple places using properties whose metadata are defined in a single property definition file. Those multiple places include default values in the property-definitions.xml file, *.properties files, test environment property files, test instance property files, test suite property files, and the command line. With some exceptions, all properties can be set in any of the aforementioned places, though most properties tend to make more sense in one or two places than in others. Java code within ProdTest, including tests, can retrieve property values using strongly typed property accessors in the Properties class, which can be retrieved easily via Globals.get( ). A test that needs to connect to another instance can do so by using the information from a new Properties object instance constructed by the test by passing in the desired environment, instance, and suite to load the properties for. Tests that are meant to run only when specific conditions about an instance are true can perform that by using the InstanceRef enum with the @OnlyTheseInstances and/or @SkipInstances annotations. Any property can appear in InstanceRef when its instanceRef attribute in property-definitions.xml is set to true.

This properties system may utilize code generation to convert the properties definition file along with the sets of known environments and instances into Java class files. For example, such target files can include:
(1) Properties: Property getters and setters;
(2) InstanceRef: Enum for properties that have instanceRef set to true in property-definitions.xml, which can be used in @OnlyTheseInstances and @SkipInstances.
(3) Environment: Enum for the environments that exist in the config/environments folder;
(4) Instance: Enum for the instances that exist across all environments;
(5) EnvironmentInstance: Enum for the known environment and instance combinations;
(6) Region: Enum for the known regions, which are taken from the alphabetic prefix of instance names that have an alphabetic prefix followed by a numeric suffix. Not all instances have a region.

The enums listed above include methods that allow navigating from one to the other. Each has a relationship with the other, so those methods were added for the convenience of enumerating an enum's related enums. ProdTest integrations that use older property names in *.properties files and command line arguments continue to work as a result of limited backward compatibility.

When properties are loaded, different places override each other in a specific order and are arranged in different blocks. Properties that are set in lower blocks override properties having the same names as those that were set in upper blocks. As an example, the command line properties trump the defaults from property-definitions.xml. Examples of such different blocks can include:
(1) Construction arguments: These may be passed into the Properties object at construction time, and these properties are environment, instance, and suite. A no-argument constructor overload gets the environment, instance, and suite properties from the command line or, if not present on the command line it can get from the *.properties files. Once set, the environment, instance, and suite properties cannot be overridden. In property-definitions.xml, they may have their overridable attributes set to false.
(2) Defaults from property-definitions.xml: Property definitions can optionally set a default value. These default values can contain property references, which can be the same as the other places where property values can be set.
(3) Basic properties: The process of loading the properties also depends on the values of some key properties. These can include configDir, environment, environmentInstance, environmentsDir, instance, prodTestHome, region, suite, and suitesDir. The values for the basic properties may have their defaults rooted in property-definitions.xml, though they can be overridden within the *.properties files. Basic properties, with the exception of environment, instance, and suite, may not be overridden using the command line. Other properties can be overridden using the command line. Before the properties loader can read the environment, instance, and suite properties, extended markup language (XML) files know their base directory paths, and the basic properties included in those paths. The basic properties can have their property substitutions performed at this point so that the final values are known before the subsequent steps in the properties loading process are executed.

(4) Environment: If the environment being loaded has an environment.xml file, then the properties within it may be read. An environment does not need to have an environment.xml file. An environment may have any number of nested subenvironments. Each subenvironment similarly may have an optional environment.xml file that applies to that subenvironment and any of its subenvironments. Each subenvironment can set any property or override properties from any ancestor environment, and those properties can be overridden by any descendant subenvironment, instance, suite, *.properties file, or command line.

(5) Instance: An instance that exists within an environment folder may include its properties XML file loaded. Every environment instance has a properties XML file, even if it contains no property overrides. The existence of an instance properties XML file within an environment folder can be similar to an instance's existence configured in ProdTest.

(6) Suite: If the suite being loaded has a suite.xml file, then the properties within it can be read. The suite typically has a suite.xml file, but it is not required. The suite.xml file for the suite typically contains property overrides that are relevant to that suite, but not to specific environments or instances.

(7) *.properties files: The property overrides that exist in *.properties files, such as default.properties and user.properties, can be used to persist property overrides without having to modify the environment, instance, or suite properties files. The override order for the *.properties files, with the last one processed being last, e.g., being as shown below:

(A) default.properties: The defaults for the basic properties may live in this file along with some additional information that is required to bootstrap Ant.

(B) user.properties: The user.properties stores persisted customizations. This file can be writable by default so that there is no need to check it out to edit it. In most cases, there is no need to edit this file, but for setting persistent defaults, such as the environment, instance, or suite to use, then they can be set here. The command line can be used to override those and other properties.

(C) build.properties: The ProdTest servers may be in the SFM datacenter, which can be controlled using ProdTest's pages on Luna, and put their own overrides into this file.

(D) server.properties: Various properties of the server.

In addition, the substitutions for these properties can be handled by an "ant" Perl script, and the resulting values maybe passed onto Ant and ProdTest via environment variables. Further, another example property block includes Command line: Properties that are not basic can be overridden by using command line system property arguments. As some exceptions, environment, instance, and suite, which are basic properties, can be overridden via the command line. These can take the form of: DpropertyName=value on the command line. Property names that are passed in via command line arguments may be case insensitive. This can be different from the other places where property overrides can exist, since the property names are case sensitive everywhere else. Legacy property names are permissible in the command line arguments. In other places where property overrides can exist, legacy property names are generally not permissible, though specific exceptions exist for *.properties files for backward compatibility. Behind the scenes, Ant may pass all system property command line arguments that it was given along to ProdTest.

Example properties defined in property-definitions.xml have getters and setters generated for them in Properties.java, excepting properties that are defined to have no getter or setter. The definitions in property-definitions.xml may also include the data type, and the generated getters and setters in Properties.java which accept and return those data types thereby making their use in ProdTest easier. Alternatively, it is possible to access property values through getProperties( ), getAllProperties( ), and substitute( ). One such property is getters and setters: example code generated for xyz in Properties.java if an integer property named maxTestAttempts is defined in property-definitions.xml, and neither the getter or setter has been disabled is given below:

```
/**
 * Gets the maximum number of attempts that will be made to run a failing
 test before marking the test as a failure.
 * This gives a test another chance to pass and, if it does pass, the test will
 be marked as passed.
 * <br/><br/>
 * The default value is 1
 * <br/><br/>
 * This property can be written to with setMaxTestAttempts( ).
 * @return The current value of the maxTestAttempts property
 * @see test.util.Properties#setMaxTestAttempts
 */
public int getMaxTestAttempts( ) {
return (Integer) properties.get("maxTestAttempts");
}
/**
 * Sets the maximum number of attempts that will be made to run a failing
 test before marking the test as a failure.
 * This gives a test another chance to pass and, if it does pass, the test will
 be marked as passed.
 * @param value The new value to configure
 * @see test.util.Properties#getMaxTestAttempts
 */
public void setMaxTestAttempts(int value) {
properties.put("maxTestAttempts", value);
}
```

The example code above can permit code elsewhere in ProdTest to retrieve its value as a primitive integer without having to convert it. When setting values, it may be the caller's responsibility to ensure that the values being set are immutable and thread-safe. The object types supported in the properties system can ensure this in most cases, but for string lists, extra work may be performed on the caller's part. Instead of setting a string list property using any plain mutable list, such as ArrayList, please make an immutable copy with ImmutableList.copyOf( ) and pass that copy into the property setter. If this is not done, another thread that retrieves the string list later may not have the most up-to-date values in the string list elements.

Another example property is the property map: The property map returned by getProperties( ) can be a live view of the underlying map with visibility and mutability restrictions applied. If a getter does not exist for a property, then it may not be present in this map. If a setter does not exist for a property that does have a getter, then it will be present in this map, but it cannot have its value updated. Hidden properties are absent from this map, though getAllProperties( ) contains hidden properties. To determine which properties are read-write and which are read-only, Properties.java can include static getters that return those property name sets. A properties user interface can use that information for mutability decorations, among other things.

Another example property is Read-Only Property Map: The property map returned by getAllProperties( ) can return an unmodifiable view of the property map, which includes hidden properties. This map may not be as expensive to work with as the map returned from getProperties( ), but it cannot be written to. To determine which properties are read-write and which are read-only, Properties.java includes static getters that return those property name sets. A properties user interface can use that information for mutability decorations, among other things.

Another example property is Property Reference Substitution: Strings that contain property references within them can have those property references substituted with their currently configured values with an example substitute( ) method. Such a method may be utilized for special cases as it is far more efficient to call a property's getter than it is to call the substitute( ) method. Property references can use the same syntax that they do in the property, *.properties, and users.xml files. As an example, calling substitute( ) with the "Hello, ${instance} on ${environment}" string replaces ${instance} with the name of the current instance and ${environment} with the name of the current environment. If the current configuration is NA1 on the qatest environment, then the string returned from substitute( ) would be "Hello, NA1 on QATEST". Note that the upper-case forms of the environment and instance names can be used in this example because those are the enum value names.

The strings from the property files and command line arguments may no longer be around by the time that substitute( ) can be called, so substitute( ) uses toString( ) on the strongly typed property value to convert it into a string. As a result, it may be best to refer to string or primitive properties in property references in substitute( ). Calling substitute( ) with a string list property reference, as an example, will substitute that property reference with the comma separated list of elements enclosed in square brackets, which might not be what the caller wants.

As a way to determine where some test cases execute, InstanceRef enum values can be referred to in @OnlyTheseInstances and @SkipInstances class or method level annotations. The property-definitions.xml file drives which enum values are generated in InstanceRef, and the properties that can be put into InstanceRef are those that have their instanceRef attribute set to true. Different property data types may be handled in their own unique ways when put into InstanceRef, as discussed in the general data types below.

One example general data type is Enum: An InstanceRef enum value may be created for every enum value in the property's enum data type. The InstanceRef enum value name can be a concatenation of the property name, an underscore character, and an enum value in the property's enum. As an example, if the "instance" property has instanceRef set to true, then every instance will have its own InstanceRef enum value. A more concrete example is InstanceRef.INSTANCE_NA1, which is applicable when the instance from Globals.get( ).getInstance( ) is Instance.NA1.

The Environment enum can be handled in a special way. An environment InstanceRef is considered applicable if the current environment is the referenced environment or any of its descendant subenvironments. This means that InstanceRef.ENVIRONMENT_QATEST may be considered applicable if the current environment is either Environment.QATEST or Environment.QATEST_SANDBOX. If the referenced environment, however, is InstanceRef.ENVIRONMENT_QATEST_SANDBOX, then only Environment.QATEST_SANDBOX makes the instance applicable. Environment.QATEST may not be a descendant of Environment.QATEST_SANDBOX.

Another example general data type is Object: If the property's value at runtime is not its blank equivalent, then the InstanceRef for it may be considered applicable. This can apply as well to strings, where a string may be non-blank for its InstanceRef to be considered applicable. Similarly, a non-empty list would make a stringlist applicable, and a proxy other than Proxy.NO_PROXY would make a proxy server property applicable.

Another example general data type is Boolean: If the property's value at runtime is true, then the InstanceRef for it may be considered applicable. Another example general data type is Integer: If the property's value at runtime is not 0, then the InstanceRef for it can be considered applicable. Another example general data type is Double: If the property's value at runtime is not 0.0, then the InstanceRef for it may be considered applicable.

With the exception of enums, a property with instanceRef set to true can generate one InstanceRef enum value. As an example, if the "sandbox" property has instanceRef set to true, then a test that can only run on a sandbox instance can use: @OnlyTheseInstances(InstanceRef.SANDBOX) to run on only sandbox instances, where the properties files set the "sandbox" property to true, e.g., on those instances that are sandbox instances.

Example environments that ProdTest knows about may be in the config/environments folder as subfolders, and the name of a subfolder in that folder concatenated with any recursive subfolders using an underscore character as the delimiter can be the environment name. That information may be copied into the generated Environment.java class. In the Environment.java class, one can get the instances within a particular environment through the getEnvironmentInstances( ) method, which returns a map of Instance objects to EnvironmentInstance objects. One can get the current environment through Globals.get( ).getEnvironment( ). Example instances that ProdTest knows about may be collected from the config/environments folders, aggregated, and written out to the generated Instance.java class file. An instance in this enum may not be a direct instance within an environment. Instead, it may be an abstraction that allows an instance that appears in multiple environments to be addressed as such. As an example, Instance.NA1 refers to all NA1 instances, regardless of the environment.

The Instance.java class may also have a getter for the region, which can return the Region enum value for this instance if one exists. Not all instances may have a region. For example, those instances that are prefixed with alphabetic characters and suffixed with numbers are considered to have a region, and the region is the alphabetic prefix. One can get the current instance through Globals.get( ).getInstance( ). An environment instance is a specific instance within an environment. Another way to look at an environment instance is as a junction between the many-to-many relationship between environments and instances. Each environment instance enum value has one environment and one instance, and both are retrievable with getters.

As an example method, the static getEnvironmentInstance( ) method returns the EnvironmentInstance enum value for the input Environment and Instance enum values.

Various methods throughout ProdTest require an EnvironmentInstance as a parameter since EnvironmentInstance is a convenient enum which refers to both an environment and an instance. One can get the current environment instance through Globals.get( ).getEnvironmentInstance( ). ProdTest can consider instances that follow naming conventions to have no region which is defined as the alphabetic prefix of an instance that includes an alphabetic prefix with a numeric suffix. In the Region.java class, one may get the instances that a region contains via the getInstances( ) method. Because regions are derived from the instances that ProdTest finds in the config/environments subfolders, every region has at least one instance. One may also get the current region through Globals.get( ).getRegion( ).

A suite in ProdTest may be a general use of the ProdTest framework. These include, but are not limited to, production testing, upgrade testing, and testing of the ProdTest framework. Suites can exist as subfolders in the config/suites folder, and the name of the subfolder is the suite's name. ProdTest may load a suite's configuration by reading the suite.xml file within a test suite folder. Example files that exist in a typical suite subfolder within config/suites are the following:

(1) suite.xml: A properties file that is processed after loading the environment and instance properties. Properties are indicated that can be relevant to a suite, regardless of the environment or instance. This file may define a sourceSuffixes property value, which references the source folder suffixes to java/src that should be included in the build and runtime classpaths whenever this suite is selected. An example is "prodtest,prodtest-test", which would effectively add java/src, java/src-prodtest, and java/src-prodtest-test to the classpath as source folder roots, and the classpath would get java/classes, java/classes-prodtest, and java/classes-prodtest-test added.

(2) test-inventory.xml: This may be the default test inventory file for the suite. This can be overridden with the "testInventory" property.

(3) users.xml: This can be the user list file for the suite, and can be overridden with the "users" property.

The above files excepting suite.xml, can exist elsewhere if suite.xml tells ProdTest to look elsewhere for them, and their filenames can be different, too. Generally, each suite may have its own source folder root in java/src-suffix, where "suffix" is the name of the test suite. It does not need to be the name of the test suite, but it might help to keep things consistent. The suite.xml file for the suite can define the source folder suffixes to include in the build and class paths, and this property is named sourceSuffixes. If suite "xyz" has its source code stored in java/src-xyz, then sourceSuffixes should be set to xyz in that suite's suite.xml file.

The property file format may be used in the environment, instance, and suite property XML files. This represents slightly less verbose than the java.util.Properties XML file format, though it may be similarly a key-value pair list expressed as XML. Element names can be property names, and the inner content of those elements are their values. An example is the following:

```
<?xml version="1.0" encoding="UTF-8"?>
<properties>
<ccList>prodtestcclist, mbenioff</ccList>
<password>test`1234z</password>
</properties>
```

The above example sets ccList to "prodtestcclist, mbenioff" and password to "test`1234z". Nested properties may also be supported in specific cases. As an XML file, values can use XML escape sequences to avoid the inadvertent introduction of markup. As an example, to set the password property to a value of </password><hello type="wo&rld">, it will need to be escaped at a minimum to </password><hello type="wo&rld>. In this example, < was escaped to < and & was escaped to &. To be consistent, the > and " characters can also be escaped.

Property values may be expressed as strings before being converted into strongly typed objects at the end of the property loading process. As strings, special considerations must be taken into account. Example main property values used are as shown below.

One example main property value is Escaping: Property values use backslash escaping. Generally, when a backslash is encountered, the next character is used as-is in the property's value. As exceptions to that rule, the characters n, r, and t may replace the escape sequence with a newline, carriage return, or a tab, respectively. As an example, if a property needed to set its property to the following text "hello\world how are you? Fine, I hope," then the property value can be set using the following value, which can unescape to the value above "hello\\world\nhow are you?\tFine, I hope." The substitution reference \${configDir} can give us the configDir property value, and \!{fdqn} gives us the fully qualified domain name. Escaping includes property values Stringlist and XML properties, and are explained below.

Stringlist properties can add another layer of unescaping using almost the same strategy as regular property values. This is because the entire value is unescaped before the stringlist code performs its own unescaping. A key difference in the two layers' unescaping strategies may involve the stringlist's optional use of enclosing a string element in double-quotes to include commas without requiring that they should be escaped with a backslash. As a result of this, stringlist elements can appear to be double-escaped in a stringlist property's overall value string.

As an example, if there is a stringlist with the first element set to "hello\world, how are you?" and the second element set to "hello[newline]world", where [newline] is a new line, then the property value for the stringlist would be the following: hello\\\\world\\, how are you?,hello\\nworld. The first level of unescaping happens on the entire value, converting it into hello\\world\, how are you?,hello\nworld. The second level of unescaping happens as elements are read from the list. As a result, the "\," subsequence is unescaped to a single comma in the first element. If it was not escaped, then the stringlist might have thought that it had three elements instead of two.

XML properties: When a property value is set in a property XML file, XML escaping can also apply. The main characters that utilize escaping in a property XML file are the less than < and ampersand & characters, which get escaped to < and &, respectively. Other characters may not need to be escaped with XML escape sequences.

Another example main property value is property values that can refer to other properties, and those properties can refer to other properties. Circular references may not be supported, and if any are detected, an IllegalArgumentException is thrown during the property loading. To refer to another property, enclose the property name with a ${ prefix and a } suffix. As an example, to include the resultsDir property in the dvtResultsDir property, the dvtResultsDir property can have its value set in a property file with the following XML: <dvtResultsDir>${resultsDir}/DVT</dvtResultsDir>. Note that the property names may be case sensitive. If an unknown property name is referenced in a substitution, then an IllegalArgumentException will get thrown during the property loading. Any place in the property loading process where property values are set can use substitutions, including special substitutions. This includes command line arguments. As one exception, however, property substitutions that exist in a *.properties file may refer to another property in a *.properties.file, which is a result of the "ant" Perl script performing substitutions on those properties before Ant is run, which can be early in ProdTest's execution.

Another example main property value is special substitutions: example special substitutions available in ProdTest are the following:

(1) Host: The name of the current host without the domain suffix. As an example, if the system's hostname is mbenioff-ws.internal.salesforce.com, then this special substitution's value is mbenioff-ws. This substitution can be the same or similar to the one in SFDC's app server settings system.

(2) fqdn: This is the name of the current host with the domain suffix. This special substitution's name is an acronym for the host's fully qualified domain name (FQDN). As an example, if the system's hostname is mbenioff-ws.internal.salesforce.com, then this special substitution's value is mbenioff-ws.internal.salesforce.com.

(3) appVersionFromServer: This is the API version of the server behind the "hostname" property's value. If the API version could not be retrieved, then a warning may be logged, and the API version from the partner.wsdl file is returned instead.

(4) appVersionFromPartnerWsdl: This is the API version from the partner.wsdl file. The code behind this reads the value from com.sforce.soap.partnerConnector.END_POINT, which can be generated from the partner.wsdl file during ProdTest's compilation, so this may be more of an indirect reference. That is, the partner.wsdl file may not actually be read as a result of using this special substitution.

The particular method described in FIGS. 3 and 4 can utilize property-definitions.xml file stored in the config folder, plays a central role in the PropertiesCodeGenerator's processing. Within its root properties element, each property element defines a single property. The attributes on a property element set the property's metadata. The optional inner text of a property element is that property's documentation, which gets used in the JavaDocs for its getters and setters in the Properties.java class. An example properties-definition.xml file is the following:

```
<?xml version="1.0" encoding="utf-8" ?>
<properties>
<property name="environment" type="environment" setter="false"
instanceRef="true" overridable="false" basic="true">
The environment being tested.
</property>
<property name="entityTestConfigDir"
default="${configDir}/entitytest" type="file">
The configuration folder for the entity tests.
</property>
<property name="uploadToQaForce" default="false" type="boolean">
Whether or not the test cases that are run will be uploaded to QaForce
upon the test run's completion.
</property>
<property name="seleniumBTPassword" type="string"/>
</properties>
```

The above illustrative example, which may miss a number of key properties, uses several data types and combinations of metadata configurations, such as: environment, entityTestConfigDir, java.io.File data type, uploadToQaForce, and seleniumBTPassword.

Example attributes that are possible on a property attribute include the following. One example attribute is name: name refers to name of the property, which maybe be a camelCase alphanumeric name that starts with a letter.

Another example attribute is Type: Type refers to the data type of the property. This attribute value is case insensitive. The blank values may also include values having entirely of whitespace characters. Such example types used are: appversion, Boolean, double, environment, Environmentinstance, executionmode, file, host, instance, integer, proxy, region, seleniumconfiglist, string, stringlist, url, users, and adding a new data type.

For the example type appversion: It comes under Java type: common.api.AppVersion and its property string value may be a PI version number, such as 11.1 or 16.0. Its value when string is blank maybe null.

For the example type Boolean: It comes under Java type: Boolean and its property string value is true or false. Its value when string is blank can be false.

For the example type double: It comes under Java type: double and its property string values are real numbers expressed as a string, such as 42 or 3.14159. Its value when string is blank may be 0.0.

For the example type environment: It comes under Java type: test.util.Environment and its property string values are any enum value that exists in the Environment enum, such as qatest. Its value when string is blank can be null.

For the example type Environmentinstance: It comes under Java type: test.util.EnvironmentInstance and its property string values are any enum value that exists in the EnvironmentInstance enum, such as production_na1. Its value when string is blank may be null.

For the example type executionmode: It comes under Java type: test.util.ExecutionMode and its property string values are any enum value that exists in the ExecutionMode enum, which are ftest, selenium, and all. Its value when string is blank can be null.

For the example type file: It comes under Java type: java.io.File and its property string values are Path to a directory or file, such as ${prodTestHome}/config or ${dotDir}/generic.dot.zip. Its value when string is blank may be null.

For the example type host: It comes under Java type: java.lang.String and its property string values are any hostname or IP address. A port number followed by a colon is optional. Unsupported characters for hostnames are converted into hyphens. If the string is not in the hostname or hostname:port format, then an IllegalArgumentException may be thrown. Its value when string is blank can be null.

For the example type instance: It comes under Java type: test.util.Instance and its property string values can be any enum value that exists in the Instance enum, such as na1 or cs3. Its value when string is blank may be null.

For the example type integer: It comes under Java type: int and its property string values can be any integer number expressed as a string, such as 3 or 90. Its value when string is blank may be 0.

For the example type proxy: It comes under Java type: java.net.Proxy and its property string values can be proxy server and port expressed as hostname:port, such as myproxy.mydomain.com:8080. Its value when string is blank may be null.

For the example type region: It comes under Java type: test.util.Region and its property string values can be any enum value that exists in the Region enum, such as na or ap. Its value when string is blank may be null.

For the example type seleniumconfiglist: It comes under Java type: java.util.List<test.util.SeleniumConfig> and its property string values can be, e.g., selenium configuration comma separated list with each element expressed as hostname:port:maxConcurrentSessions:browserStart, where hostname:port addresses a selenium server, maxConcurrentSessions is the maximum number of concurrent sessions to send that selenium server, and browserStart is the browser start string to send to the selenium server. As an example, my-selenium-server:4444:5:*firefoxproxy will send up to five concurrent selenium sessions to my-selenium-server on port 4444, and the browser that will be used is Mozilla Firefox. As another example, "my-selenium-server:4444: 5:*firefoxproxy,another-selenium-server:4444:10:*firefoxproxy /usr/local/firefox3/firefox" (without the double quotes) will also send up to 10 selenium sessions to another-selenium-server:4444, and Mozilla Firefox will be started by explicitly invoking /usr/local/firefox3/firefox instead of having selenium find where Firefox exists. With the second selenium server included, ProdTest can also load balance sessions between those two selenium servers, and more than two selenium servers can be used for a browser. Its value when string is blank may be null.

For the example type string: It comes under Java type: java.lang.String and its property string values can be any string value. Note that in a properties XML file, the < and & characters must be escaped properly with < and & respectively. Its value when string is blank may be null.

For the example type stringlist: It comes under Java type: java.util.List<java.lang.String> and its property string values can be comma separated list of strings with backslash escaping. When a backslash is encountered, the next character is copied as-is unless if it is n, r, or t, which are converted to a newline, a carriage return, or a tab, respectively. If a double-quote character is encountered, then characters up to the next double-quote character are part of the element, including any commas. Its value when string is blank may be null.

For the example type url: It comes under Java type: java.lang.String and its property string values are comma separated list of strings with backslash escaping. A string can be formatted as a URL, such as http://na1.salesforce.com. Characters within the URL's host part that are not valid hostname characters will be converted into hyphens. If the string is not formatted as a recognizable URL, then an IllegalArgumentException is thrown. The java.net.URL class was not used because it is mutable and is rather inefficient for how ProdTest primarily uses URLs, which is with string concatenation. Its value when string is blank may be null.

For the example type users: It comes under Java type: test.util.Users and its property string values may be Path to a users.xml file, such as ${suitesDir}/${suite}/users.xml. Its value when string is blank can be null.

For the example type of adding a new data type: To add a new data type, a new enum value is added to build.PropertiesCodeGenerator.PropertyDataType and to test.util.PropertyDataType. The name of the new enum value may be equal in both enum classes. The former can be used during code generation to store information about the Java type information for the property as well as how to cast the return value in the generated getter, and the latter may be used at runtime to convert a property's string value into a strongly typed Java object. In general, a property value that is nonexistent, blank, or having entirely of whitespace must map to null. If the property value string does not properly describe a constructible instance of the data type, then an IllegalArgumentException may be thrown.

Another example attribute is getter: When the value of getter is true, which is the default, a getter will be generated for this property in Properties.java. The map returned by the getProperties( ) method can also include this property. When the values of getter is false, a getter will not be generated, and the map returned by the getProperties( ) method will not include this property. Such properties are known as hidden properties. When the getter attribute is false, the setter attribute may also be set to false. Otherwise, the code generator might display a warning and skip the code generation for such properties. Hidden property values can be accessed via the getAllProperties( ) method in the generated Properties.java class, and the hidden property names can be accessed via the getHiddenPropertyNames( ) static method.

Another example attribute is setter: When the value of setter is true, which is the default, a setter may be generated for this property in Properties.java. When false, a setter may not be generated, and the map returned by the getProperties( ) method prevents updates to such properties. These properties are known as read-only properties. When the getter attribute is false, the setter attribute must also be false. Write-only properties are not supported. The read-only property names can be accessed via the getReadOnlyPropertyNames( ) static method, and the read-write property names can be accessed via the getReadWritePropertyNames( ) static method.

Another example attribute is default: The default value for the property, which can be used if nothing else overrides it. For overridable properties, this default value can be overridden by any other place where a property can be set, such as in a properties XML file for an environment, instance, or suite, in a *.properties file, or via the command line. For properties that are not overridable, setting a default value in the property definition ensures that no other place can set the property. If this attribute is not present, then the default value will be null for object types, false for booleans, 0 for integers, and 0.0 for doubles.

Another example attribute is instanceRef: When the instanceRef: is true, this property can be included in the generated InstanceRef enum, which can be used in @ Only. TheseInstances and @SkipInstances annotations. This attribute may be false by default.

Another example attribute is basic: When the value of basic is true, this property may have its property substitution references resolved early in the property loading process. Only a very small set of properties may be meant to be basic, and these are the properties that influence important dependencies in the property loading process, such as where the config, environments, and suites folders are located. It is almost safe to say that no more basic properties should be added to the property-definitions.xml file. If a basic property is to be added, then the approach is probably incorrect. This attribute may be set to false by default.

Another example attribute is legacyNames: Comma delimited list of case insensitive property names that can be used on the command line as an alternative to the property's defined name. This is primarily meant for backward compatibility. As an example, the legacyNames attribute value for the testFilter property is ftest.runSingleTest. When ProdTest sees the ftest.runSingleTest property on the command line, it will set the testFilter property. This list uses backslash escaping. When a backslash is encountered, the next character is copied as-is unless if it is n, r, or t, which are converted to a newline, a carriage return, or a tab, respectively. If a double-quote character is encountered, then all characters up to the next double-quote character are part of the current legacy name, including any commas. Note that this only works with command line property arguments. Property files and *.properties files must use the exact case-sensitive property name as defined in property-definitions.xml, and legacy names will not be honored in property files and *.properties files. This attribute is null by default, which makes the property's name the only way to override such properties from the command line. The names of properties with no legacyNames attribute are also case insensitive on only the command line.

Another example attribute is overridable: When true, which is the default, this property can be overridden after being set. Setting this to false may prevent the setting of such a property after the first place that sets a value for it. As an example, if a non-overridable property has its first value set in a test instance properties file, then an exception may be thrown if any subsequent place in the properties loading order tries to set a value for that property. If a default value is set in the property-definitions.xml file, then no other place can effectively override its value. This property attribute is similar to the inverse of Java's "final" modifier.

Another example attribute is spaceDelimited: When true and when the property type is stringlist, each whitespace subsequence of a property value string can be converted into a single comma before the property value string gets deserialized into a List<String> collection. This is useful for legacy properties that were primarily space delimited, and this approach for supporting such properties effectively makes them delimited by either spaces or comma. No escape sequence exists for spaces in the processing of the values of properties that have this enabled, so use of this property attribute is not recommended for new properties. If this is true on a property whose type that is not a stringlist, then a warning can be displayed, and the property will be ignored. This attribute can be set to false by default.

Usernames for different environment, instance, org, and user type combinations can be accessed through the Users.java class by retrieving it via Globals.get( ).getUsers( ). The Users.java file may not be generated, though it does read the users.xml file that the "users" property tells it to read.

The users.xml file allows any hierarchical combination of environment, instance, org, and username elements to set the usernames. Usernames values can include substitution references, though the permissible references are limited to environment, instance, and org, and their context is limited to the users.xml file that they appear in. That means that the substitutions in users.xml do not refer to properties. As an example, if a test suite knows that the main username for any org is prodtest@${instance}.${org}.sfdctest, where ${instance} is any instance name on any environment and ${org} is the name of the org, then this default username can be set without any environment or instance, such as in the following example:

```
<?xml version="1.0" encoding="utf-8" ?>
<users>
<username type="main" value="prodtest@${instance}.${org}.sfdctest" />
...
```

Without having to specify any environments or instances, Users.java knows the username for any org on any environment instance, though the org names still must be defined in users.xml. We can make the above example complete by adding the definition of the generic org. Some tests rely upon a default org name to be set, and the value of the "defaultOrg" property must equal the name of one org defined in the test suite's users.xml. Note that org names are case insensitive.

```
<?xml version="1.0" encoding="utf-8" ?>
<users>
<username type="main"
value="prodtest@${instance}.${org}.sfdctest" />
<org name="generic" />
</users>
```

While the above example works for many instances, some instances may not have the instance name as a part of the username. NA0 is one such example, where the generic org's username might be prodtest@generic.sfdctest. To override the username for all NA0 instances, regardless of the environment, the following can be used:

```
<?xml version="1.0" encoding="utf-8" ?>
<users>
<username type="main" value="prodtest@${instance}.${org}.sfdctest" />
<instance name="na0">
<username type="main" value="prodtest@${org}.sfdctest" />
</instance>
<org name="generic" />
</users>
```

To add to this example, one might want to say that prodtest@${org}.sfdctest also applies to development environments, such as a localhost SFDC instance. The following example override for the development environment accomplishes this:

```
<?xml version="1.0" encoding="utf-8" ?>
<users>
<username type="main" value="prodtest@${instance}.${org}.sfdctest" />
<instance name="na0">
<username type="main" value="prodtest@${org}.sfdctest" />
</instance>
<environment name="development">
<username type="main" value="prodtest@${org}.sfdctest" />
</environment>
<org name="generic" />
</users>
```

Sometimes, a special case breaks the default pattern. Using any desired nesting of elements, it is possible to add that override to users.xml, such as in this particular example:

```
<?xml version="1.0" encoding="utf-8" ?>
<users>
<username type="main"
value="prodtest@${instance}.${org}.sfdctest" />
<instance name="na1">
<username type="main" value="prodtest@${org}.sfdctest" />
<environment="qatest">
    <org name="generic">
<username type="main"
value="prodtest2@${instance}.${org}.sfdctest" />
</org>
</environment>
</instance>
<environment name="development">
<username type="main" value="prodtest@${org}.sfdctest" /
</environment>
<org name="generic" />
</users>
```

The ${instance} and ${org} substitutions in prodtest2@${instance}.${org} is prodtest2@na1.generic.sfdctest, since it also can apply to any other combination of org, environment, and instance. Since the nesting order may not matter when specifying all three parent elements for username, the element nesting could have been environment→org→instance, org→instance→environment, or others. When getUsername( ) on a Users.java instance is called, such as with Globals.get( ).getUsers( ).getUsername( ), the method determines the username based on the following order of the information known for a particular username element from the users.xml file. The first match can be used, and the order prefers more specific data over less specific data. At the end, the org, environment, and instance combination is cached so that subsequent lookups become fast.

Substitutions may be performed at substantially the moment when org, environment, and instance are all known. This can occur during the processing of users.xml when usernames that have all three known are seen as well as during the getUsername( ) method call when missing data is filled in from the method's parameter arguments. If the users.xml file has multiple occurrences of the same amount of information for the same org, environment, and instance names, then the last one that appears in the file may be used. Attributes from the previous element occurrences, however, will be used if they are not overridden later. This means that if an org element for the generic org defines its dot file, then a subsequently occurring org element also for the generic org will keep the previously set dot file attribute unless if it overrides it with a new value.

The users file format can include elements, such as org, environment, instance and username. In an example org element: The org element may represent a ProdTest org that typically exists on every instance in every environment. Examples include the generic ProdTest org and the B2I ProdTest org. The edition, dot, and email values can include substitutions from any ancestor element, though attempts to reference a value that does not exist in an ancestor element will result in an IllegalArgumentException. Example attributes of the org elements can include: name: case-insensitive name of the org; edition: org's edition, such as EE or DE; dot: relative name of the DOT file; and email: email address to use for the prodtest user during the org signup process in ProdTest.

In an example environment element: The environment element can the scope to the environment named in the name attribute. The name attribute specifies the name of the environment, which may match an enum value in the generated Environment.java class. This value can be case insensitive.

In an example instance element: The instance element can restrict the scope to the instance named in the name attribute. The name attribute of the instance can match an enum value in the generated Instance.java class. This value can be case insensitive.

In an example username element: The username element sets the username from the value attribute for the user type referenced in the type attribute. The username value can include the environment, instance, and org substitution references, and this is regardless of the username element's ancestors, if any. Also, a password attribute may be added. Example attributes of the element Username include: value: specifies the username for this username element, and can include substitution references regardless of context; and type.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for testing a module, the method comprising:
    accessing source code of a test framework that is configured for testing the module;
    creating a configuration folder having a property override for a test suite for the module testing;
    determining a source root folder for the test suite;
    starting the test framework by passing in an identifier for the test suite; and
    adding a custom test to the source root folder using the configuration folder to customize the test suite.

2. The method of claim 1, wherein determining the source root folder comprises creating the source root folder if a predetermined test suite is not to be used for the customized test suite.

3. The method of claim 2, wherein determining the source root folder comprises adding a router to another source root folder if the predetermined test suite is to be extended for the customized test suite.

4. The method of claim 1, further comprising:
    starting the test framework with each of a plurality of test folders enabled for authoring changes to a library associated with the source code for the test framework; and
    compiling the test framework with each of the plurality of test folders enabled.

5. The method of claim 4, further comprising:
    using a refactoring tool to make changes in a file within the test framework.

6. A non-transitory machine-readable storage medium having one or more instructions thereon for testing a module, the instructions when executed by one or more processors causing the one or more processors to carry out:
    creating a configuration folder having a property override for a test suite for the module testing;
    determining a source root folder for the test suite;
    starting the test framework by passing in an identifier for the test suite; and
    adding a custom test to the source root folder using the configuration folder to customize the test suite.

7. The non-transitory machine-readable storage medium of claim 6, wherein determining the source root folder comprises creating the source root folder if a predetermined test suite is not to be used for the customized test suite.

8. The non-transitory machine-readable storage medium of claim 7, wherein determining the source root folder comprises adding a router to another source root folder if the predetermined test suite is to be extended for the customized test suite.

9. The non-transitory machine-readable storage medium of claim 6, further comprising:
    starting the test framework with each of a plurality of test folders enabled for authoring changes to a library associated with the source code for the test framework; and
    compiling the test framework with each of the plurality of test folders enabled.

10. The non-transitory machine-readable storage medium of claim 9, further comprising:
    using a refactoring tool to make changes in a file within the test framework.

11. An apparatus for testing a module, the apparatus comprising:
    a processor; and
    one or more stored sequences of instructions which, when executed by the processor, cause the processor to carry out:
        creating a configuration folder having a property override for a test suite for the module testing;
        determining a source root folder for the test suite;
        starting the test framework by passing in an identifier for the test suite; and
        adding a custom test to the source root folder using the configuration folder to customize the test suite.

12. The apparatus of claim 11, wherein determining the source root folder comprises creating the source root folder if a predetermined test suite is not to be used for the customized test suite.

13. The apparatus of claim 12, wherein determining the source root folder comprises adding a router to another source root folder if the predetermined test suite is to be extended for the customized test suite.

14. The apparatus of claim 11, further comprising:
    starting the test framework with each of a plurality of test folders enabled for authoring changes to a library associated with the source code for the test framework; and
    compiling the test framework with each of the plurality of test folders enabled.

15. The apparatus of claim 14, further comprising:
    using a refactoring tool to make changes in a file within the test framework.

* * * * *